(No Model.) 2 Sheets—Sheet 2.
N. S. JOHNSON.
HAY LOADER.
No. 381,699. Patented Apr. 24, 1888.
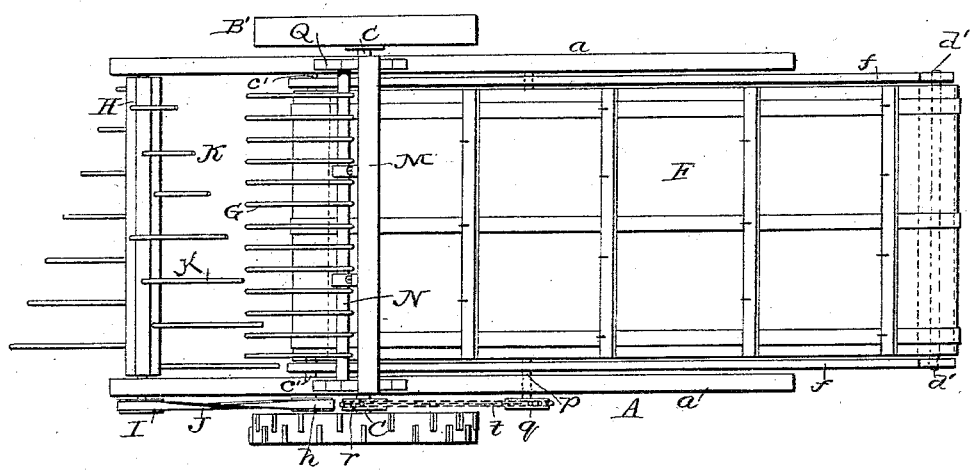
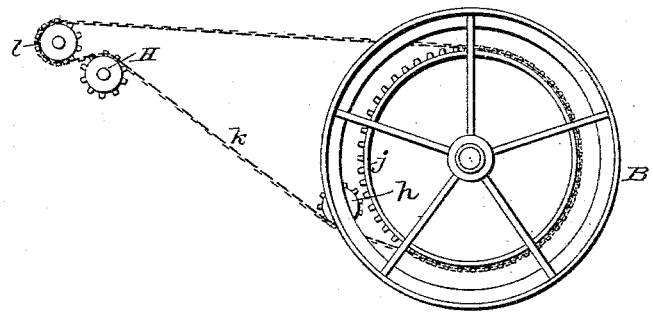
Witnesses:
James F. DuHamel
William H. Shipley
N. S. Johnson,
Inventor:
by Dodge & Sons,
Attys

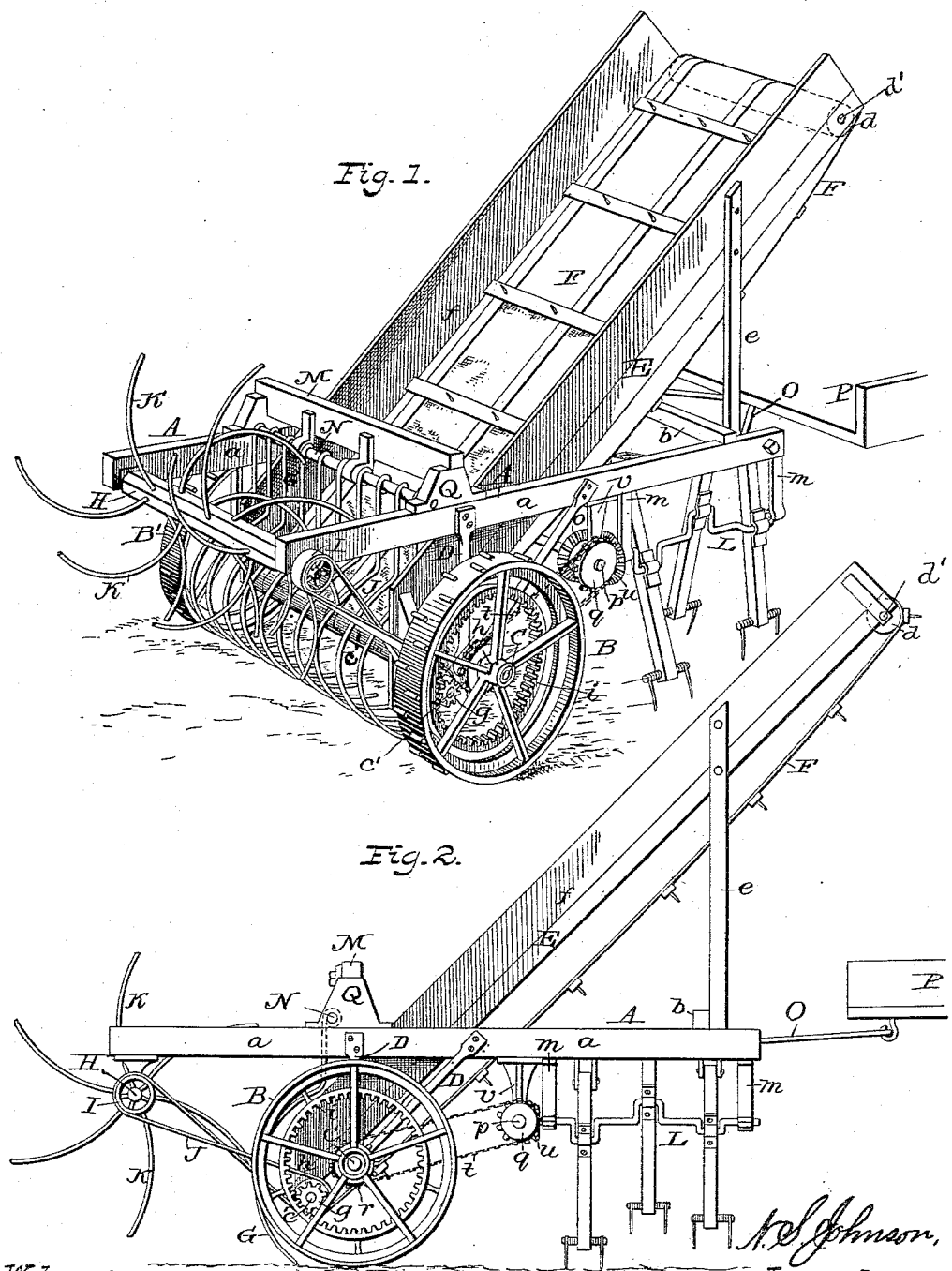

UNITED STATES PATENT OFFICE.

NATHAN S. JOHNSON, OF MENDON, MICHIGAN, ASSIGNOR OF ONE-HALF TO EDWARD S. JOHNSON, OF SAME PLACE.

HAY-LOADER.

SPECIFICATION forming part of Letters Patent No. 381,699, dated April 24, 1888.

Application filed August 6, 1887. Serial No. 246,320. (No model.)

*To all whom it may concern:*

Be it known that I, NATHAN S. JOHNSON, of Mendon, in the county of St. Joseph and State of Michigan, have invented certain new and useful Improvements in Hay-Loaders, of which the following is a specification.

My invention relates to hay-loaders, and has reference more particularly to that class of machines in which an endless elevating belt or apron is employed and which are secured to the rear end of a wagon into which the hay or grain is discharged.

In the accompanying drawings, Figure 1 is a perspective view of my improved hay-loader; Fig. 2, a side view of the same, showing a slightly-different arrangement for supporting the rotating feeder; Fig. 3, a top plan view of a portion of the machine, and Fig. 4 a view illustrating a slight modification in the mechanism for imparting motion to the feeder and apron.

A indicates the frame of the machine, which is mounted upon wheels B B', which latter are mounted upon opposite ends of a shaft or axle, C, carried in suitable brackets or supports, D, depending from the side bars of the machine, as shown in Figs. 1 and 2. The frame A comprises two substantially parallel side bars, *a a*, connected at their forward ends by a cross-bar, *b*, and at one or more intermediate points, if desired. Between the side bars, *a a*, and secured rigidly thereto, is an elevator, E, provided with an endless belt or apron, F, of any desired construction. The said belt passes at opposite ends about rollers *c* and *d*, the shafts *c'* and *d'* of which are journaled in the side boards, *f*, of the elevator, as clearly shown in Figs. 1 and 2, while the upper end of the elevator is supported by braces *e*, which extend upward from the side bars, *a a*, of the frame A, as shown in Figs. 1 and 2.

The elevator will of course be provided with side wings or boards, *f*, which prevent the escape of the hay or grain from the sides or edges of the apron.

The shaft *c'* of the roller *c* is provided at one end with a small pinion or gear-wheel, *g*, and with a small band-wheel, *h*, as shown in Figs. 1 and 2, the gear-wheel *g* being arranged to mesh with and receive motion from an annular toothed gear-ring, *i*, formed upon or secured to the driving-wheel B, thereby giving the necessary motion to the elevator-apron.

The rake G is mounted upon the frame A in rear of the elevator, the teeth of the rake curving downwardly in rear of the lower end of the elevator, as shown in Figs. 1, 2, and 3.

The teeth of the rake are secured upon a shaft or bar, N, which is journaled at its ends in brackets Q, secured to the side bars, *a a*, the shaft N being further supported by brackets depending from the cross-bar M, secured to the brackets Q, as shown in Figs. 1 and 3.

I do not wish to limit myself to any particular construction of the elevator-frame or of the rake, as these are matters that may be varied without departing from the spirit of my invention.

H indicates a shaft journaled in the rear ends of the side bars, *a a*, or in brackets depending therefrom, as may be found most convenient, the said shaft being provided at one end with a band-wheel, I, as shown in Figs. 1, 2, and 3, which is adapted to receive a crossed belt, J, which passes about the wheel *h* on the shaft *c'* of roller *c*.

Between the side bars the shaft H is provided with a series of curved teeth or fingers, K, which, as shown in Figs. 1, 2, and 3, are bent or curved in a direction the reverse of that of the rake-teeth, and it will be observed that the teeth K are of such length as to extend inward between the rake-teeth and close to the lower end of the elevator-apron. The crossing of the belt J imparts a backward or reverse rotation to the shaft H, which, with its teeth, I term a "feeder."

In practice I provide the shaft *c'* with a gear-wheel at each end and provide the wheels B B' each with a gear-ring. In lieu, however, of employing the driving mechanism for the feeder and the elevator, as shown in Fig. 1, that shown in Fig. 4 may be used, if deemed desirable. In this arrangement the wheel B is provided with a sprocket-wheel, *j*, about which passes a chain, *k*, the chain also passing about a wheel, *l*, at the rear end of the side bars, up over the upper side of a wheel secured upon the end of shaft H, and beneath the wheel secured upon the end of roller *c*, the single chain imparting the necessary motion both to the elevator-apron and to the feeder.

As the machine is drawn along it is desirable that it should make a clean path, and in order to secure this result it is necessary to divide or separate that portion which is to be raked up from the remaining portion of the grain upon the ground, and in order to secure this result I employ a divider, which is clearly shown in Figs. 1 and 2, and which receives motion, preferably, from the driving-wheel B.

Depending from one of the side bars, $a$, are brackets or supports $m$, in which is mounted a cranked shaft, L, carrying at its rear end a bevel-pinion, $u$, which latter is adapted to mesh with a similar wheel, $o$, carried by a shaft, $p$. This shaft $p$ is journaled in brackets $v$ upon the frame A, and is provided with a sprocket-wheel, $q$, about which and a sprocket-wheel, $r$, secured to the wheel B, a chain, $t$, passes, as shown in Figs. 1, 2, and 3.

Mounted upon the cranked portions of the shaft L are one or more dividing-legs, which are provided at their lower ends with teeth or fingers and loosely connected at their upper ends to the side bars of the frame A, as shown in Figs. 1 and 2.

The connection at the upper ends of the dividing-legs is preferably by means of two links or bars, which are connected to the side bars by means of hooks and eyes, and connected to the divider-legs by means of bolts which pass freely through slots in the upper ends of said legs. I do not wish to limit myself, however, to this precise construction and arrangement, as it is apparent that other forms of dividing apparatus, operating in substantially the same manner, will answer equally well. As the machine is drawn along the shaft L is set in motion through the belt $t$ and bevel-gear $o\ u$, and the dividers are caused to divide the grain and separate that which is to be raked up from that which remains upon the ground, so that when the rake G takes hold of the grain it will not draw under the wheel more than the elevator can properly dispose of. As the rake G catches hold of the grain it causes the latter to ride up the inner curved faces of its teeth until it comes into contact with or falls over upon the apron F, by which the grain is elevated and discharged into the wagon. As the machine is thus being drawn along motion is imparted to the feeder, the reversely-curved teeth of which, projecting inward between the teeth of the rake, catch hold of the hay and help it up the inner faces of the rake-teeth, and aid in elevating it sufficiently to allow it to fall upon the apron, and it will be noticed that the form of the teeth K is such as to enable them to withdraw readily from the grain upon which they act. This dividing attachment will be found particularly useful when loading a heavy crop of grain, and will be found also to prevent the grain from clogging at the corner or side of the carrier.

The loader will be secured to the rear end of the wagon P by means of links O, or in any other suitable manner.

I am aware that a hay-loader has been provided with two fixed rakes projecting outwardly at an angle from the frame of the machine, and with a vibrating rake arranged to sweep the hay toward the center from the front of each of the inclined rakes, and to this combination I make no claim.

My dividing attachment is not designed for the same purpose as this, but is for the sole purpose of separating the hay that is to be gathered up from that which is to remain upon the ground, thereby rendering the work of the rake cleaner than it would otherwise be, and also preventing the clogging of the machine upon that side adjacent to the grain.

Having thus described my invention, what I claim is—

1. In a hay-loader, the combination, with a wheeled frame, of an elevating-apron, a rake in rear thereof, and a divider mounted lengthwise upon the frame of the machine in advance of the rake and comprising a series of depending legs adapted to oscillate in a plane at right angles to the travel of the machine and divide the grain.

2. In a hay-loader, the combination, with a wheeled frame, of an elevating-apron, a rake in rear of said apron, a rotating feeder located in rear of the rake and adapted to be actuated positively as the machine is drawn along, and a positively-actuated divider comprising a series of depending oscillating legs mounted upon the main frame in advance of the rake, whereby they are adapted to divide the grain as the machine is drawn along.

3. In combination with frame A, wheels B B', a sprocket-wheel, $r$, secured to the wheel B, a shaft, $p$, mounted in the frame parallel with the axle of wheels B B' and provided with sprocket-wheel $q$ and bevel-gear $o$, a crank-shaft, L, mounted upon the frame at right angles to shaft $p$ and provided at one end with a bevel-gear, $u$, to mesh with gear $o$, divider-legs applied to said shaft L, substantially as shown, and a belt, $t$, serving to communicate motion from the driving-wheel B to the divider-legs.

In witness whereof I hereunto set my hand in the presence of two witnesses.

NATHAN S. JOHNSON.

Witnesses:
G. P. DOAN,
A. J. BENEDICT.